US012682896B2

(12) United States Patent
Haguel et al.

(10) Patent No.: US 12,682,896 B2
(45) Date of Patent: Jul. 14, 2026

(54) SYSTEM AND METHOD FOR THE GENERATION OF WORKLISTS FROM INTERACTION RECORDINGS

(71) Applicant: NICE LTD., Ra'anana (IL)

(72) Inventors: Tal Haguel, Petach Tikva (IL); Yael Dayan, Hadera (IL); Amram Amir Cohen, Tel Aviv (IL); Alexander Lynn, Raannana (IL); Mor Kasus, Gedera (IL); Neta Rosenfeld, Ra'anana (IL)

(73) Assignee: NICE LTD. (IL)

( * ) Notice: Subject to any disclaimer, the term of this patent is extended or adjusted under 35 U.S.C. 154(b) by 82 days.

(21) Appl. No.: 18/529,447

(22) Filed: Dec. 5, 2023

(65) Prior Publication Data

US 2025/0182752 A1     Jun. 5, 2025

(51) Int. Cl.
| | |
|---|---|
| *G10L 15/197* | (2013.01) |
| *G10L 15/16* | (2006.01) |
| *G10L 15/22* | (2006.01) |

(52) U.S. Cl.
CPC ............ *G10L 15/197* (2013.01); *G10L 15/16* (2013.01); *G10L 15/22* (2013.01); *G10L 2015/223* (2013.01)

(58) Field of Classification Search
CPC ....... G10L 15/197; G10L 15/16; G10L 15/22; G10L 2015/223; G10L 15/183; G10L 15/063; G06F 40/289; G06F 40/30; G06N 3/044; G06N 3/045; G06N 3/08
See application file for complete search history.

(56) References Cited

U.S. PATENT DOCUMENTS

| | | | | |
|---|---|---|---|---|
| 6,658,377 | B1 * | 12/2003 | Anward | G06F 40/268 |
| | | | | 704/9 |
| 10,387,575 | B1 * | 8/2019 | Shen | G06F 40/35 |
| 2003/0191627 | A1 * | 10/2003 | Au | G06F 40/30 |
| | | | | 704/9 |
| 2007/0106499 | A1 * | 5/2007 | Dahlgren | G06F 16/243 |
| | | | | 704/10 |
| 2009/0112835 | A1 * | 4/2009 | Elder | F16K 15/16 |
| 2010/0063799 | A1 * | 3/2010 | Jamieson | G06F 16/36 |
| | | | | 704/10 |
| 2011/0144996 | A1 * | 6/2011 | Ma | G06F 16/332 |
| | | | | 704/251 |
| 2016/0299965 | A1 * | 10/2016 | Starr | G06F 16/335 |
| 2017/0075877 | A1 * | 3/2017 | Lepeltier | G06F 40/117 |
| 2018/0060921 | A1 * | 3/2018 | Mengle | G06Q 30/0276 |

(Continued)

*Primary Examiner* — Michael Colucci

(57)     ABSTRACT

A system and method for generating a list of tasks from an interaction recording may include a computing device; a memory; and a processor, the processor configured to: identify, for each sentence of one or more sentences of an interaction recording, whether the sentence comprises at least two nouns and at least one verb; generate a set of actionable items using a long short-term memory (LSTM) model by: when the sentence does not comprise at least two nouns and at least one verb, deleting the sentence; and when the sentence comprises at least two nouns and at least one verb, generating an actionable item; input the actionable items to a language model to generate a list of tasks. Computer systems may use a generated list of tasks to automatically allocate work to agents of a contact center or to automatically update a status of a completed task.

20 Claims, 12 Drawing Sheets

---

Here is the worklist for your recent interaction:

1. Call vacation advisor to cancel reservation.

○ Done    ○ Pending    ○ NA

2. Send confirmation mail once approval is received.

○ Done    ○ Pending    ○ NA

3. Call customer once vacation advisor team is available.

○ Done    ○ Pending    ○ NA

Save

(56) References Cited

U.S. PATENT DOCUMENTS

| 2019/0228099 | A1* | 7/2019 | Bajaj | G06N 3/044 |
| 2021/0103634 | A1* | 4/2021 | Gkikas | G06F 40/211 |
| 2024/0015371 | A1* | 1/2024 | Biswas | H04N 21/8549 |
| 2024/0378776 | A1* | 11/2024 | Mishra | G06F 40/205 |

* cited by examiner

300

<u>500</u>

| |
|---|
| IDENTIFYING, FOR EACH SENTENCE OF ONE OR MORE SENTENCES OF AN INTERACTION RECORDING, WHETHER THE SENTENCE COMPRISES AT LEAST TWO NOUNS AND AT LEAST ONE VERB.    502 |

| |
|---|
| GENERATING A SET OF ACTIONABLE ITEMS USING A LONG SHORT-TERM MEMORY (LSTM) MODEL BY: WHEN THE SENTENCE DOES NOT COMPRISE AT LEAST TWO NOUNS AND AT LEAST ONE VERB, DELETING THE SENTENCE; AND WHEN THE SENTENCE COMPRISES AT LEAST TWO NOUNS AND AT LEAST ONE VERB, GENERATING AN ACTIONABLE ITEM.    504 |

| |
|---|
| INPUTTING THE ACTIONABLE ITEMS TO A LANGUAGE MODEL TO GENERATE A LIST OF TASKS.    506 |

| |
|---|
| RECEIVING, BY A COMPUTER SYSTEM, INPUT FROM AN AGENT RELATED TO TASKS OF A LIST OF TASKS.    508 |

| |
|---|
| DISTRIBUTING TASKS OF A LIST OF TASKS, BASED ON THE INPUT FROM THE AGENT.    510 |

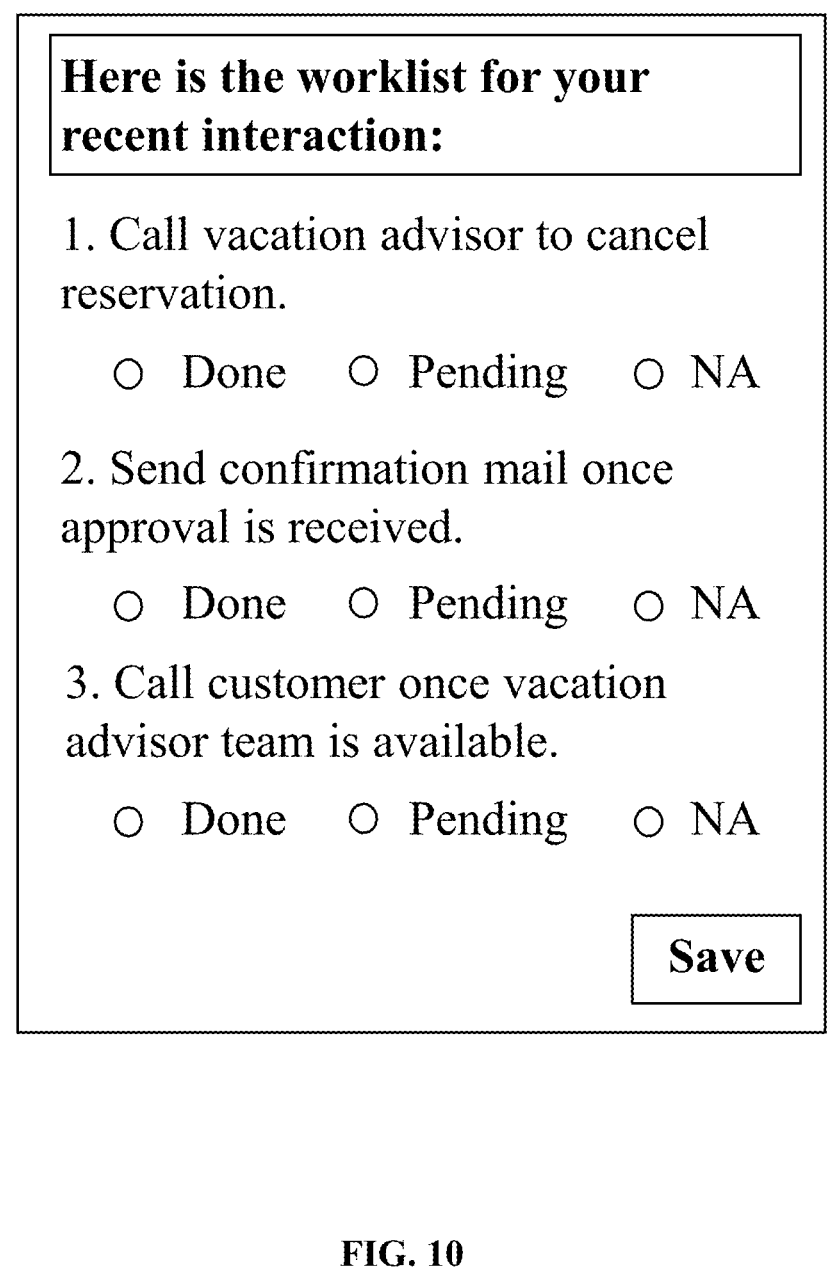

Here is the worklist for your recent interaction:

1. Call vacation advisor to cancel reservation.

○ Done    ○ Pending    ○ NA

2. Send confirmation mail once approval is received.

○ Done    ○ Pending    ○ NA

3. Call customer once vacation advisor team is available.

○ Done    ○ Pending    ○ NA

Save

FIG. 10

Figure 11:
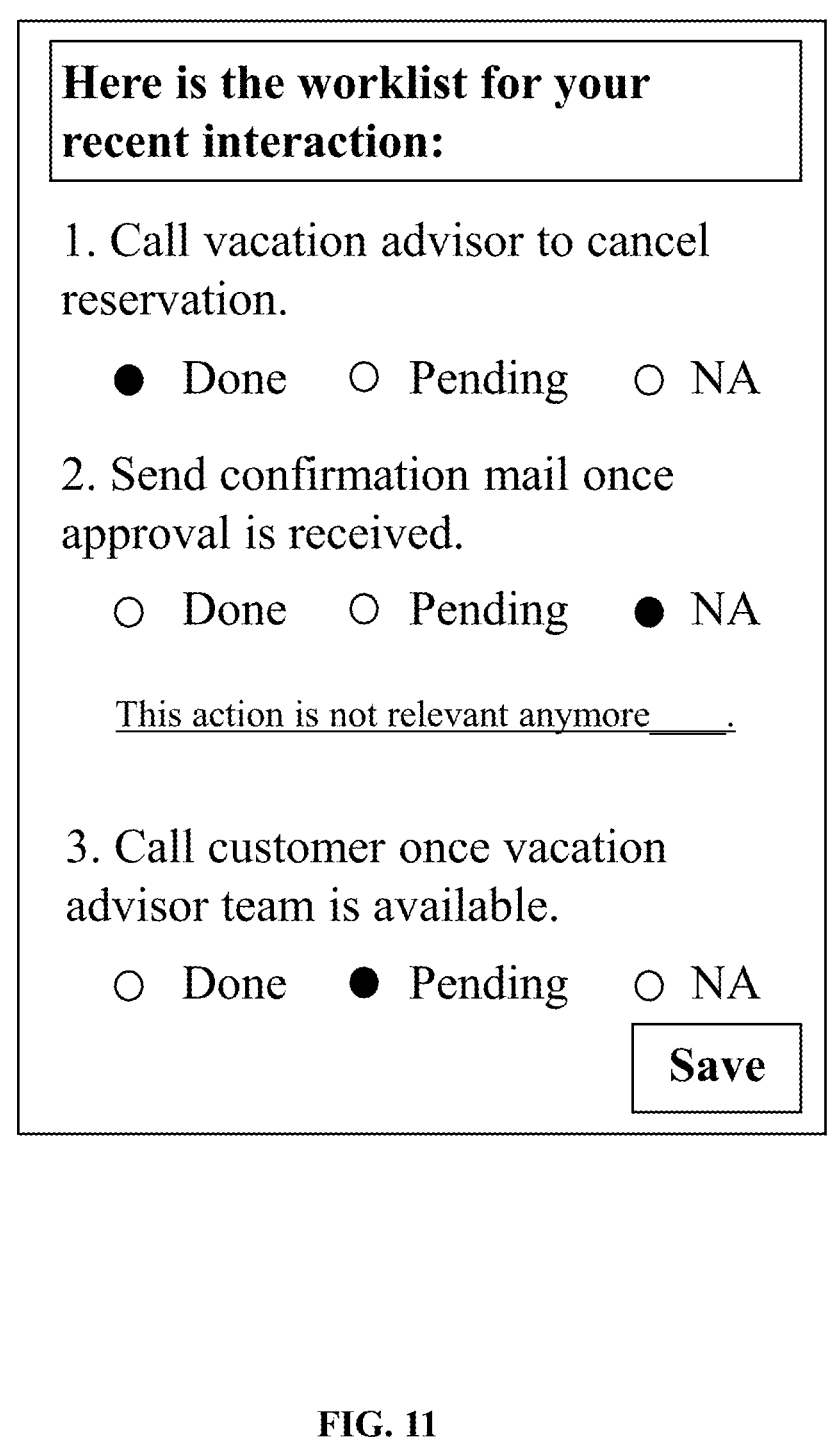

Here is the worklist for your recent interaction:

1. Call vacation advisor to cancel reservation.

● Done    ○ Pending    ○ NA

2. Send confirmation mail once approval is received.

○ Done    ○ Pending    ● NA

This action is not relevant anymore____.

3. Call customer once vacation advisor team is available.

○ Done    ● Pending    ○ NA

Save

SYSTEM AND METHOD FOR THE GENERATION OF WORKLISTS FROM INTERACTION RECORDINGS

TECHNICAL FIELD OF THE INVENTION

The present invention relates generally to the automatic computer processing and/or generation of tasks from interaction recordings, for example the generation of tasks for computer systems to complete, or for agents of contact centers from the analysis of sentence structures of interaction recordings.

BACKGROUND OF THE INVENTION

In interactions between customers and agents of contact centers, agents may receive a large of information on a specific customer issue in a short period of time and are required to manually process provided information within a short period of time.

Commonly, agents may be allocated a defined period of time in which they are required to deal with a customer issue and to generate a strategy to solve a customer issue. In cases when an allocated handling time for a customer issue is too short, agents may be overwhelmed with information and may not be able to process relevant information that have been provided by a customer to provide an efficient line of actions to solve a customer issue.

Prior art tools can provide a summary of the customer issue, but they fall short in producing actions for computer systems or guiding agents on required steps that may allow agents to provide a comprehensive answer to a customer issue raised in an interaction.

Thus, there is a need for a solution that allows for automatically generating tasks lists for computer systems or agents of contact centers that are based on evaluated interaction recordings of interactions with customers.

SUMMARY OF THE INVENTION

Improvements and advantages of embodiments of the invention may include automatically generating a list of tasks from an interaction recording, e.g. an interaction recording for an interaction between an agent using an agent device and customer using a customer device. Based on the interaction, tasks or action items may be presented to or suggested to an agent to carry out, such as an agent contacting a client at a future time or performing other actions, e.g. the generation of work schedules for agents of a contact center based on generated lists of tasks.

The automatic generation of tasks lists may reduce the time of agents to process customer information, can lead to a faster resolution of customer issues and, thus, may lead to an increased handling time of agents of contact centers. A computer system may use a list of tasks to automatically distribute data representing interactions to agents of a contact center, e.g. a computer system may distribute outstanding or pending tasks of a list of tasks to agents or may update a status of a task that an agent has completed.

In particular, improvements and advantages of embodiments of the invention may include using a long-short term memory model in the analysis of interaction recordings that can track the progress in dealing with a customer issue and can identify the status for each tasks of a list of tasks at the end of a customer agent interaction. Embodiments may improve the technology of natural language processing by adapting natural language processing tools to the handling of interaction recordings that arise from agent customer interactions, e.g. by training natural langue processing tools to identify sentences in interaction recordings that include a specific combination of nouns, verbs and optionally temporal values such as at least two nouns, at least one verb and optionally a temporal value. Embodiments may improve the technology of computer automation by automatically allocating tasks to agents of a contact center that arise from interaction recordings. Automatic allocation and re-distribution of tasks may allow contact centers to share the workload evenly between agents and, at the same time, to distribute a task to an agent who is most suited to carry out a specific task.

One embodiment may include a method of generating a list of tasks from an interaction recording, the method including: identifying, for each sentence of one or more sentences of an interaction recording, whether the sentence includes at least two nouns and at least one verb; generating a set of actionable items using a long short-term memory (LSTM) model by: when the sentence does not include at least two nouns and at least one verb, deleting the sentence; and when the sentence includes at least two nouns and at least one verb, generating an actionable item; and inputting the actionable items to a language model to generate a list of tasks.

In one embodiment, the at least two nouns are identified probabilistically by comparing one or more constituents of the sentence with a plurality of recorded nouns of the LSTM model.

In one embodiment, the at least one verb is identified probabilistically by comparing one or more constituents of the sentence with a plurality of recorded verbs of the LSTM model.

One embodiment includes filtering one or more sentences of the interaction recording which are outgoing interactions of an agent device.

In one embodiment, identifying includes the identification of at least two nouns, at least one verb and at least one temporal value, and the method includes: when the sentence does not include the at least two nouns, at least one verb and at least one temporal value, deleting the sentence; and when the sentence includes the at least two nouns, at least one verb and at least one temporal value, generating an actionable item.

One embodiment includes ordering the actionable items by the at least one temporal value.

One embodiment includes generating an indication whether a task of the list of tasks is completed.

In one embodiment, the list of tasks comprises a pre-indication to a status of each task identified by the LSTM model.

One embodiment includes updating a previously generated a list of tasks by the list of tasks generated from the interaction recording.

In one embodiment, the list of tasks is used in the automatic distribution of workload between agents of a contact center.

One embodiment may include a system for generating a list of tasks from an interaction recording, the system including: a computing device; a memory; and a processor, the processor configured to: identify, for each sentence of one or more sentences of an interaction recording, whether the sentence includes at least two nouns and at least one verb; generate a set of actionable items using a long short-term memory (LSTM) model by: when the sentence does not include at least two nouns and at least one verb, deleting the sentence; and when the sentence comprises at least two nouns and at least one verb, generating an actionable item; input the actionable items to a language model to generate a list of tasks.

One embodiment may include a method for generating a schedule of actions from an interaction transcript, wherein the method includes: dividing at least one sentence of an interaction transcript into one or more parts; generating a set of actionable items using a long short-term memory (LSTM) model by: identifying, for each sentence of the at least one sentence, whether the one or more parts of the sentence include at least two nouns and at least one verb, and: when the parts of the sentence do not include the at least two nouns and the at least one verb, deleting the sentence; and when the parts of the sentence includes the at least two nouns and the at least one verb, generating an actionable item; subjecting the actionable items to a language model to generate a schedule of actions.

These, additional, and/or other aspects and/or advantages of the present invention may be set forth in the detailed description which follows; possibly inferable from the detailed description; and/or learnable by practice of the present invention.

Embodiments may provide improvements over prior art technology, for example the identification of a first noun, a second noun and a verb within a sentence allows the creation of tasks lists for agents of a contact center. A system may include a neural network model that can identify and can predict the presence of a first noun, a second noun and a verb within a sentence. The accuracy in the prediction of constituents of a sentence that fall into one of the categories "first noun", "second noun" and "verb" can be updated based on agent feedback for tasks of generated lists of tasks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 depicts a flowchart of methods of generating a list of tasks from an interaction recording, according to some embodiments of the present invention.

FIG. 10 depicts an example of a generated list of tasks for an interaction recording, according to some embodiments of the present invention.

FIG. 11 depicts an example of a generated list of tasks for an interaction recording including pre-indicated answers to the generated list of tasks, according to some embodiments of the present invention.

Figure 1:
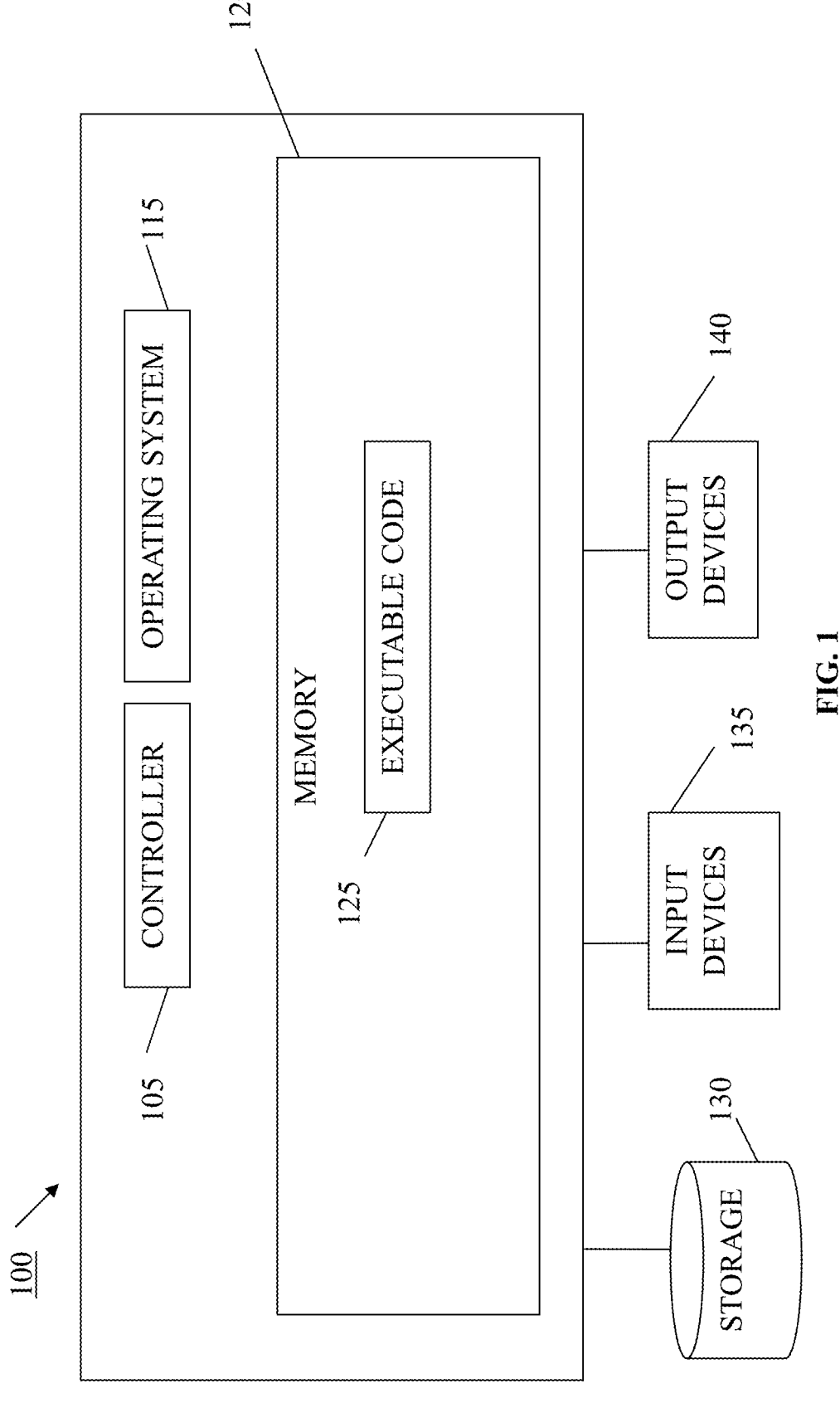
FIG. 1 shows a block diagram of an exemplary computing device which may be used with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "contact center" may refer to a centralized office used for receiving or transmitting a large volume of enquiries, communications, or interactions. The enquiries, communications, or interactions may utilize telephone calls, emails, message chats, SMS (short message service) messages, etc. A contact center may, for example, be operated by a company to administer incoming product or service support or information enquiries from customers/consumers. The company may be a contact-center-as-a-service (CCaaS) company.

As used herein, "call center" may refer to a contact center that primarily handles telephone calls rather than other types of enquiries, communications, or interactions. Any reference to a contact center herein should be taken to be applicable to a call center, and vice versa.

As used herein, "interaction" may refer to a communication between two or more people (e.g., in the context of a contact center, an agent and a customer), typically via devices such as computers, customer devices, agent devices, etc., and may include, for example, voice telephone calls, conference calls, video recordings, face-to-face interactions (e.g., as recorded by a microphone or video camera), emails, web chats, SMS messages, etc. An interaction may be recorded to generate an "interaction recording". An interaction recording may also refer to the data which is transferred and stored in a computer system recording the interaction, the data representing the interaction, including for example voice or video recordings, data items describing the interaction or the parties, a text-based transcript of the interaction, etc. Interactions as described herein may be "computer-based interactions", e.g., one or more voice telephone calls, conference calls, video recordings/streams of an interaction, face-to-face interactions (or recordings thereof), emails, web chats, SMS messages, etc. Interactions may be computer-based if, for example, the interaction has associated data or metadata items stored or processed on a computer, the interaction is tracked or facilitated by a server, the interaction is recorded on a computer, data is extracted from the interaction, etc. Some computer-based interactions may take place via the internet, such as some emails and web chats, whereas some computer-based interactions may take place via other networks, such as some telephone calls and SMS messages. An interaction may take place using text data, e.g., email, web chat, SMS, etc., or an interaction may not be text-based, e.g., voice telephone calls. Non-text-based interactions may be converted into text-based interaction recordings (e.g., using automatic speech recognition). Interaction data and Interaction recordings may be produced, transferred, received, etc., asynchronously.

As used herein, "agent" may refer to a contact center employee that answers incoming interactions, and may, for example, handle customer requests.

A "noun" may be a word that is used to identify any of a class of people, a place, things, e.g. tangible objects or intangible concepts, or to name a particular one of these.

A "verb" may be a word that expresses an act, occurrence, or mode of being, that in various languages is inflected for agreement with the subject, for tense, for voice, for mood, or for aspect. A verb may commonly have a full descriptive meaning and characterizing quality but is sometimes nearly devoid of these especially when used as an auxiliary or linking verb. A verb may be in a grammatical future form. E.g. a verb may be linked to an auxiliary verb (e.g. "will") or a terminology (going to) that may indicate that an act, an occurrence or a mode of being that has an implication to the future, e.g. a planned event in the future such as a meeting.

A temporal value, such as "tomorrow", "on Friday", "at 3 pm", "next month", "on 31 Aug. 2026", may be a word or a sequence of words within a sentence that indicates a point of time, e.g. a point of time, e.g. a point of time in the future or in the past.

"Actionable items" may be sentences or fragment of sentences that have been identified to include at least two nouns, a verb and optionally a temporal value. Several actionable items which have been identified from sentences of an interaction recording may be combined in a "list of actionable items". Actionable items may include at least two nouns, a verb and optionally a temporal value. Actionable items may originate from previous sentences of an interaction recording which have been pre-processed, e.g. to delete greetings. Accordingly, actionable items may be input into a language model to generate a "list of tasks".

A "list of tasks" may include actionable items that have been modified by a language model, e.g. to adapt the sentence structure of the actionable items. For example, actionable items may be modified by a language model to create tasks that include sentences that are worded as instructions, e.g. requests for agents to carry out a job. A task of a list of tasks may optionally include temporal values. Temporal values may give an indication or provide a time limit by which a task needs to be completed.

Tasks of a list of tasks may be "automatically distributed". For example, automatic distribution may refer to a system allocating a task to an agent, e.g. a task to contact a client or re-distributing a task that has previously been distributed to an agent to another agent. Tasks or actionable items may include nouns, e.g. names of agents, names of clients, items such as routers, telephones or communication-related items. Tasks or actionable items may include verbs, e.g. "call", "contact", "follow up" or "record". Actionable items may be, for example, "Agent X . . . to restart a router . . . will call client Y." or "Contact client Z . . . an agent skilled in dealing with software issues". Resulting tasks may read, for example, "Agent X: call client Y to restart the router" or "An agent skilled in dealing with software issues: call client Y".

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms. In a supervised ML approach, input sample data may include data which is labeled, for example, in the present application, the input sample data may include a transcript of an interaction and a label indicating whether or not the interaction was satisfactory. In an unsupervised ML approach, the input sample data may not include any labels, for example, in the present application, the input sample data may include interaction transcripts only.

ML models may, for example, include (artificial) neural networks (NN), decision trees, regression analysis, Bayesian networks, Gaussian networks, genetic processes, etc. Additionally or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

In practice, a NN, or NN learning, can be simulated by one or more computing nodes or cores, such as generic central processing units (CPUs, e.g., as embodied in personal computers) or graphics processing units (GPUs such as provided by Nvidia Corporation), which can be connected by a data network. A NN can be modelled as an abstract mathematical object and translated physically to CPU or GPU as for example a sequence of matrix operations where entries in the matrix represent neurons (e.g., artificial neurons connected by edges or links) and matrix functions represent functions of the NN.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10s or even 100s of Teraflops, or a large set of cores. On modern GPUs this can be done using 4,000-5,000 cores.

Decision trees may refer to a data structure or algorithm including, or capable of representing, a series of linked nodes. Decision trees may be used for classification of a data instance/object into a certain class by interrogating features of the instance/object. The linked nodes may include a root node, at least one leaf node (or terminal node), and likely one or more internal nodes, wherein the root node may be connected to a plurality of child nodes (internal or leaf), the internal nodes may be connected to one parent node (internal or root) and a plurality of child nodes, and the leaf node may be connected to one parent node. To classify an object/instance with a decision tree, it may be traversed, wherein traversal begins at the root node. Each root node or internal node may interrogate a feature of the object in a way that categorizes the object into one of a plurality of categories (often two categories corresponding to two child nodes). Each of these categories may be associated with one of the plurality of connected child nodes, and when an object is found to be in one of the categories, the traversal of the decision tree may move to the associated child node. This process may continue until the presently considered node of the traversal is a leaf node. Each leaf node may be associated with a class or classification of the object (e.g., satisfactory or unsatisfactory) and may not further interrogate features of the object. In some embodiments, decision trees may be implemented with object-oriented programming. In some embodiments, a decision tree may be constructed based on existing/past data (e.g., existing interaction and/or score data, which may also be associated with an indication of whether the interaction was satisfactory). Construction of a decision tree may be configured to maximize/minimize a metric, such as constructing a decision tree so as to maximize an information gain metric. In some embodiments, the features that are most important for categorization may be higher up or closer to the beginning/root of the tree, and features that are less important may be further from the root.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment and other devices and modules discussed herein, e.g. computing device 202, agent device 210, customer device 220, a data engine 304 or a CX copilot application 306 provided by NICE Ltd., and modules in FIGS. 2, 3, 4, 5, may be or include, or may be executed by, a computing device such as included in FIG. 1 although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIG. 3 according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by, for example, executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
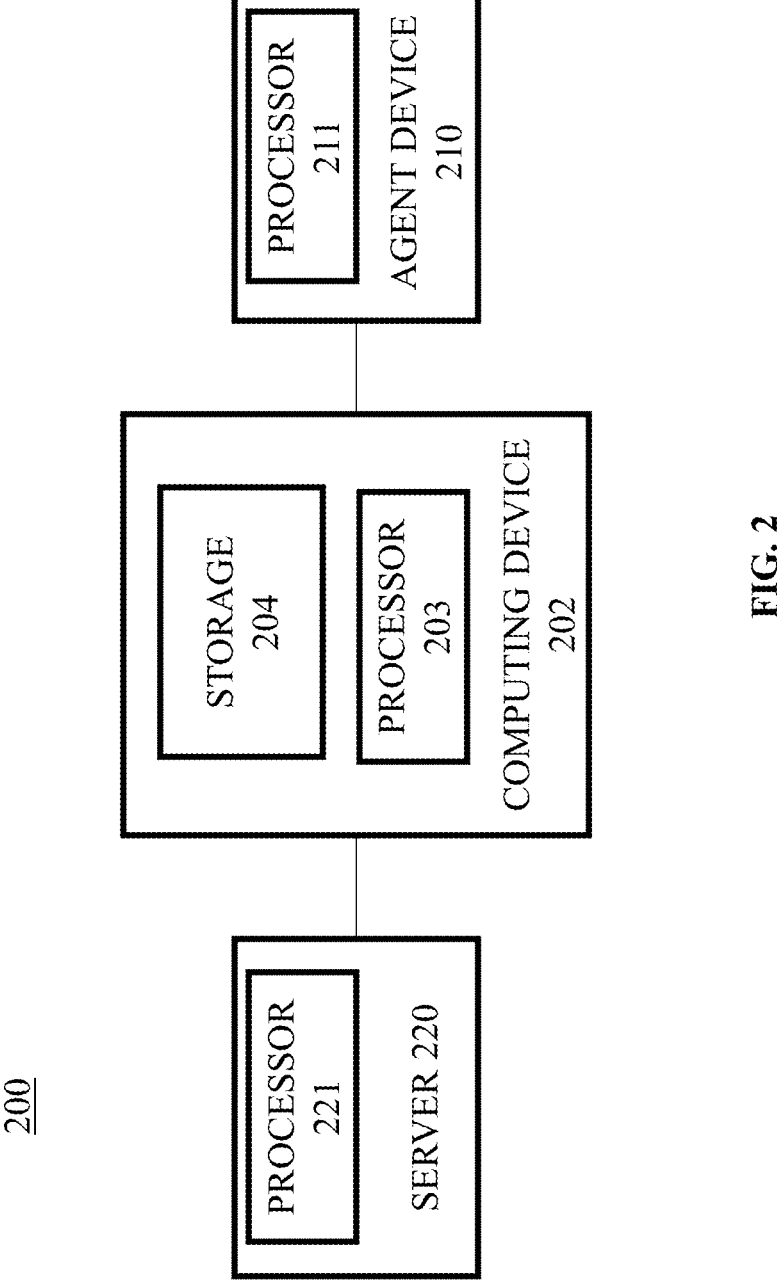
FIG. 2 is a schematic drawing of a system for generating a list of tasks from an interaction recording, according to some embodiments of the invention.

FIG. 2 is a schematic drawing of a system 200 according to some embodiments of the invention. System 200 may include a computing device 202 including a processor 203 and storage 204. Computing agent device 202 may be connected to an agent device 210 that includes processor 211. Computing device 202 may be connected to a server 220 including processor 221. Server 220 and Agent device 210 may provide computing device 202 with interaction recordings. Alternatively, interaction recordings may be stored in storage 204 of computing device 202.

Computing devices 100, 202, 210 and 220 may be servers, personal computers, desktop computers, mobile computers, laptop computers, and notebook computers or any other suitable device such as a cellular telephone, personal digital assistant (PDA), video game console, etc., and may include wired or wireless connections or modems. Computing devices 100, 202, 210 and 220 may include one or more input devices, for receiving input from a user (e.g., via a pointing device, click-wheel or mouse, keys, touch screen, recorder/microphone, or other input components). Computers 100, 202, 210 and 220 may include one or more output devices (e.g., a monitor, screen, or speaker) for displaying or conveying data to a user.

Any computing devices of FIGS. 1 and 2 (e.g., 100, 202, 210 and 220), or their constituent parts, may be configured to carry out any of the methods of the present invention. Any computing devices of FIGS. 1 and 2, or their constituent parts, may include a data engine 304 or a CX copilot application 306 provided by NICE Ltd., or another engine or module, which may be configured to perform some or all of the methods of the present invention. A systems and methods of the present invention may be incorporated into or form part of a larger platform or a system/ecosystem, such as agent management platforms. The platform, system, or ecosystem may be run using the computing devices of FIGS. 1 and 2, or their constituent parts. For example, a processor such as processor 203 of computing device 202 processor 211 of device 210, and/or processor 221 of computing device 220 may be configured to identify, for each sentence of one or more sentences of an interaction recording, whether the sentence comprises at least two nouns and at least one verb. A processor such as processor 203 of computing device 202 processor 211 of device 210, and/or processor 221 of computing device 220 may be configured to divide at least one sentence of an interaction transcript into one or more parts. For example, a processor such as processor 203, 211 and/or 221 may be configured to generate a set of actionable items using a long short-term memory (LSTM) model by: when the sentence does not comprise at least two nouns and at least one verb, deleting the sentence; and when the sentence comprises at least two nouns and at least one verb, generating an actionable item. A processor such as processor 203 of computing device 202 processor 211 of device 210, and/or processor 221 of computing device 220 may be configured to generate a set of actionable items using a long short-term memory (LSTM) model by: identifying, for each sentence of the at least one sentence, whether the one or more parts of the sentence comprise at least two nouns and at least one verb, and: when the parts of the sentence do not comprise the at least two nouns and the at least one verb, deleting the sentence; and when the parts of the sentence comprises the at least two nouns and the at least one verb, generating an actionable item. For example, a processor such as processor 203 may be configured to input the actionable items to a language model, e.g. the Open AI Generative Pre-trained Transformer by OpenAI, to generate a list of tasks. For example, a language model may receive input such as "Call back team available" and may generate output such as "Call back the team once they are available". A processor such as processor 203 of computing device 202 processor 211 of device 210, and/or processor 221 of computing device 220 may be configured to subject the actionable items to a language model to generate a schedule or list of actions.

Figure 3:
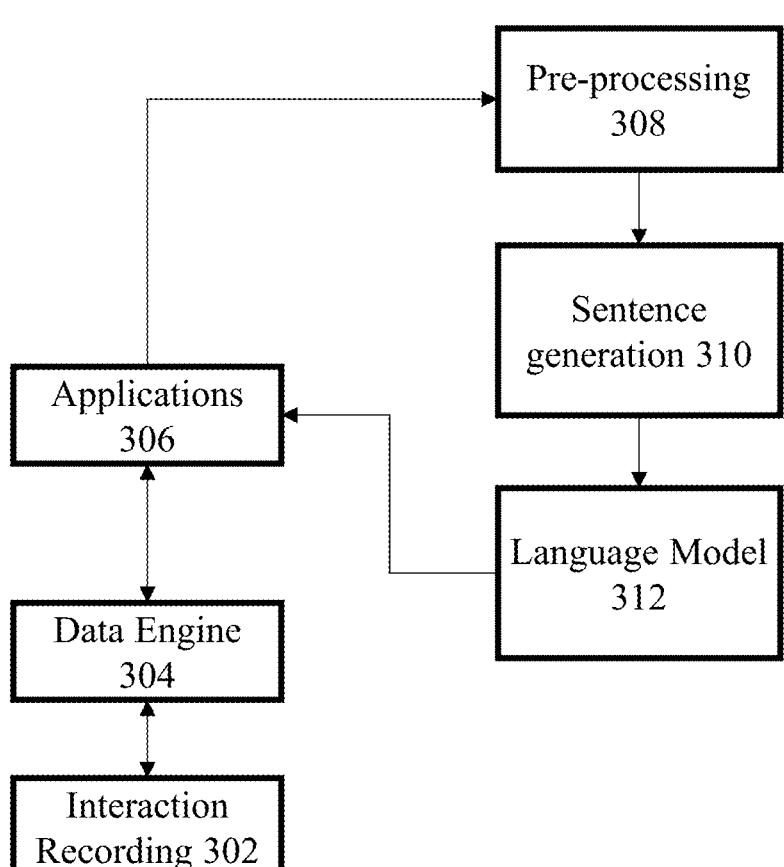
FIG. 3 is a schematic drawing of a system for generating a list of tasks from an interaction recording, according to some embodiments of the invention.

FIG. 3 shows a dataflow diagram that may be executed by a computing device, e.g. computing device 100 or computing device 202 for generating a list of tasks from an interaction recording.

An interaction recording, e.g. interaction recording 302, may be retrieved from a database or an agent computing device, for example agent device 210, via a data engine application, such as data engine 304, that manages the storage and the provision of interaction recordings, e.g. for a contact center, and may be stored in storage 204 of computing device or in storage of agent device 210 or server 220.

For example, once an interaction ends, an application executed by computer device 202, e.g. a CX copilot application 306, may request an interaction recording from a computing device, e.g. computing device 202. Application 306 may then initiate the pre-processing 308 of an interaction recording.

Figure 4:
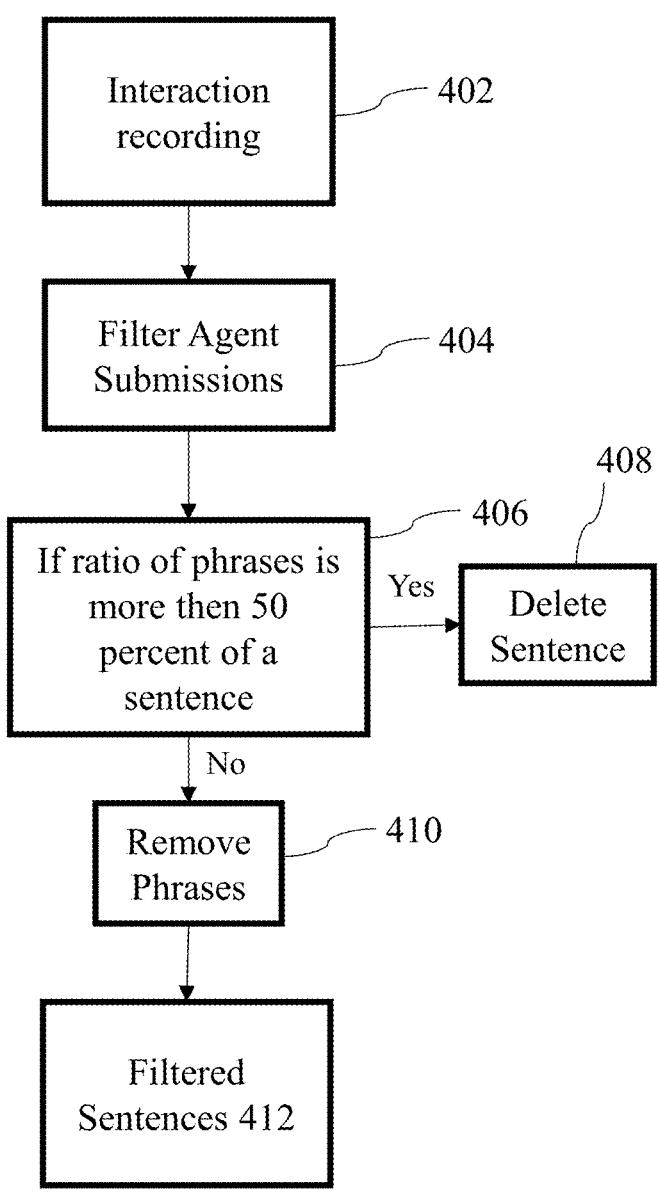
FIG. 4 is a schematic drawing illustrating pre-processing of sentences of an interaction recording, according to some embodiments of the invention.

FIG. 4 shows a dataflow diagram that illustrates steps of the pre-processing of an interaction recording, e.g. interaction recording 402. An interaction recording 402 may be filtered for interactions that have been initiated by an agent (404). For example, sentences of an interaction recording which have been recorded or identified as originating from a customer, e.g. a reply of a customer to an agent, may be deleted from an interaction recording. In addition, phrases in sentences such as greetings, set phrases and courtesy remarks (e.g. "hello", "good bye", "thank you", "please" etc.) may be deleted from sentences of an interaction recording.

For example, upon receival of an interaction recording 402, a service, e.g. a CX copilot application 306 executed by system 100, may filter sentences of an interaction recordings for agent submissions 404. Sentences of an interaction recording that have been assigned to agent submissions may be analyzed for phrases such as greetings, set phrases and courtesy remarks 406. Sentences may be assessed in their ratio of identified phrases to the remaining content of the sentence by calculating a ratio of the number of words for a sentence which include phrases to the overall number of words within a sentence (406); while an example ratio of 50% is used, other ratios may be used. A threshold may be set for a ratio of words of a phrase to the total number of words within a sentence for which a sentence is deleted or for which only a phrase is deleted. For example, in case that more than 50% of the words of a sentence have been identified as phrases, the sentence is deleted (408). In case that less than 50% of the words of a sentence have been identified as phrases, identified phrases within a sentence may be deleted (410). Other thresholds may be used.

For example, interaction recording A may read:

Agent: Hello, you reach xx company, how can I help you?

Customer: Thank you, my name is Jon can you please assist me with the modem?

Agent: Sure, can you please reset the modem for me?

Customer: Sure, thank it is working now, thank you.

Interaction recording A may undergo pre-processing to remove or filter out content provided by a customer and to remove phrases to provide a processed interaction recording B:

Agent: you reach xx company.

Agent: can you reset the modem for me.

The remaining, filtered sentences 412 of an interaction recording, e.g. interaction recording 402 may include sentences that do not include phrases and can be used in the sentence generation 310 as shown in FIG. 3.

FIG. 5 shows a flowchart of a method 500 of generating a list of tasks from an interaction recording, e.g. an interaction recording which may have been received by computing device 202. The system displayed in FIG. 2 and the method shown in FIG. 5 may refer to the generation of a list of tasks from an interaction recording which have been received from an agent device, e.g. 210, or a database, e.g. server 220, however, the system and the method may also be used to generate a list of tasks from an interaction recording when executed on a server or agent device. According to some embodiments, some or all of the steps of the method are performed (e.g., fully or partially) by one or more of the computational components, for example, those shown in FIGS. 1 and 2.

Method 500 for generating a list of tasks from an interaction recording may be executed by a processor of computing device 202, such as processor 203. For example, method 500 may allow generating a schedule of actions from an interaction transcript. An action may be an outstanding or previously completed task by an agent. An interaction recording may be a recording of an interaction via a digital channel, e.g. a text-based chat such as an online chat or a text chat using an application between an agent device of an agent and a customer device of a customer. An interaction recording can be a textual representation of an interaction such as an audio transcription, a chat transcription an email or a transcript of any other form of digital communication. It may be pre-processed, e.g. as described in FIGS. 3 and 4.

In operation 502, for each sentence of one or more sentences of an interaction recording, it may be identified whether the sentence includes at least two nouns and at least one verb. The identification of a first noun may allow determining a person, e.g. an agent who may carry out a specific action or task. The identification of a second noun may allow determining an object, e.g. a router, computer etc., that interacts with a first noun. The identification of a first verb may allow determining a mode of action or a relationship between a first noun and a second noun, e.g. when a verb is identified as in a future tense, it may indicate a task that is to be completed in the future.

For the identification of nouns and verbs within a sentence, an interaction recording may be separated into words that are analyzed using an LSTM model. For example, sentences of an interaction recording, such as an interaction transcript, may be divided into one or more parts.

An LSTM model may be a recurrent neural network that is capable of learning long-term dependencies. Simple neural networks may process input data independently, e.g. without a connection between a first input and a second input after a certain period of time, e.g. after a second, a minute or an hour. An LSTM model may have a memory cell that can store information for a long range, allowing the network to capture long-term dependencies in sequential data. A memory cell may act as a "neuron" that can capture information from previous inputs and remember it for a long time, e.g. a time period of an interaction between a customer and an agent.

An LSTM cell may have three gates: an input gate, a forget gate and an output gate.

An input gate may determine which information of an interaction recording should be stored in the memory cell. For example, a memory cell can store identified nouns, verbs and temporal values of a sentence.

In operation 504, a set of actionable items may be generated using an LSTM model by deleting a sentence when a sentence does not includes at least two nouns and at least one verb, and generating an actionable item when the sentence includes at least two nouns and at least one verb.

An LSTM model can categorize words of a sentence, e.g. it can identify if a constituent of a sentence is a noun, verb or a temporal value by comparing the word to previously processed data, e.g. a previously analyzed sentences of an interaction recording. In other words, nouns, verbs and temporal values can be identified by pre-training an LSTM model with previously provided nouns, verbs and temporal values.

For example, a constituent of an sentence of an interaction recording may be identified as a noun with a certain probability, e.g. based on comparison to previously identified nouns. If a constituent, e.g. a word, has been identified as a noun with a probability that is higher than a set threshold probability, e.g. a probability higher than 80%, a sentence may be identified as including a noun.

For example, a constituent of a sentence of an interaction may be identified as a verb with a certain probability, e.g. based on comparison of a constituent to previously identified verbs. If a constituent has been identified as a verb with a probability that is higher than a set threshold probability, e.g. a probability higher than 80%, a sentence may be identified as including a verb.

An LSTM model may be trained to retain identified nouns, verbs or temporal values for a given time period, e.g. during a customer agent interaction or during a sequence of customer agent interactions. Accordingly, previously identified nouns, verbs and temporal values can be used in the prediction of words in subsequent sentences within an interaction recording. Additionally, an LSTM model can handle variable-length input sequences, e.g. sentences that comprise a variable number of words.

An LSTM cell may include a forget gate that determines which constituents of sentences of an interaction recording should be discarded from a memory cell. For example, constituents within a sentence that cannot be probabilistically identified as a noun, verb or temporal value may be discarded and may not be used as context in the assessment of subsequent sentences of an interaction recording.

An LSTM model may include an output gate that determines which constituents of sentences of an interaction recording should be output from a memory cell. For example, when a sentence includes at least two nouns and at least one verb, an output of a memory cell may be an actionable item that may include at least two nouns, at least one verb and optionally a temporal value. An actionable item of a sentence may include identifying at least two nouns and at least one verb.

For example, a sentence of an interaction recording of an agent may read or include:

Agent X: you reach xx company.

Agent X: can you, Agent Y, reset the modem for me.

An output, after applying an LSTM model and a language model to modify the sentence structure generate the sentence or actionable item such as:

Agent Y, reset modem.

In some embodiments, an LSTM model may be pre-trained to identify whether a sentence includes at least two nouns, at least one verb and at least one temporal value. In addition to the presence of at least two nouns, at least one verb, the LSTM model identifies whether constituents of a sentence include at least one temporal value. When the sentence does not comprise the at least two nouns, at least one verb and at least one temporal value, a sentence may be deleted. When a sentence includes the at least two nouns, at least one verb and at least one temporal value, an actionable item may be generated from the sentence. Accordingly, in case that an LSTM model requires the identification of at least two nouns, at least one verb and at least one temporal value, an actionable item of a sentence may include identified at least two nouns, at least one verb and at least one temporal value.

In operation 506, actionable items may be input to a language model, e.g. language model 312, which when it receives the items may generate a list of tasks. A list of tasks may be, for example, a schedule of actions that is generated for an agent of a contact center based on the subjecting of actionable items to a language model. In some embodiments, an actionable item may be an action for an agent to take (e.g. reset customer's modem) and a task in a list may be the actionable item including additional text, e.g. articles or other language improving readability, and/or with a specific time and/or date to complete that item added to the actionable item. A list of tasks may include items such as "1. Agent X, call client Y on Thursday at 5 pm. 2. Agent X call client Z on Friday at 2 μm and 3. Agent X, call client W on Friday at 4 pm". A language model may modify the sentence structure of an actionable item to generate a structured sentence. A structured sentence may be a sentence that complies with grammatical rules, e.g. syntactical rules of a language such as English. A language model may update a sentence's syntax to create a sentence that is easily understandable by a human.

In an example, an actionable item may read or include:

Reset modem

A task of a list of tasks adapted by a language model may read or include:

Reset the modem

In a second example, an actionable item may read or include:

Call bank team update.

A task of a list of tasks adapted by a language model may read or include:

Call the bank team to update.

A list of tasks may include tasks, e.g. events that have been mentioned by an agent in an interaction recording. For example, a list of tasks may include identified tasks that an agent has been asked to complete in the future. In case that each task of a list of tasks includes a temporal value, tasks of a list of tasks may be automatically ordered by the at least one temporal value for each task. Tasks may be ordered by a date by which they have to be completed. For example, a task with a temporal value "next week" may be listed earlier than a task including a temporal value "next year".

Application 306, e.g. a CX Copilot application, may be used to automatically identify responses to tasks within an interaction recording to identify a status for each task of a generated list of tasks. For example, a status for a task may be "done", pending", "NA". Tasks that are labelled as "done" may be tasks that have been completed. Tasks that are labelled as "pending" may be tasks that an agent can work on. For example, an answer "pending" may allow application 306 to schedule a completion date for an actionable item or, for example, to schedule a date for a future interaction between an agent and a client. In an example, application 306 may automatically assign a list of tasks to agent A or may allocate tasks to agent B in case that an agent A is unavailable to work on an initially allocated task. An answer "NA" may indicate that a task is not relevant. For example, a non-relevant task may be a task that is not applicable, e.g. the task cannot be executed at a given point in time.

A previously generated list of tasks may also be updated or altered by a list of tasks generated from a later interaction recording. For example, after an agent interacted with a customer in a second interaction, e.g. a second chat, an interaction recording of the second chat may be created that undergoes steps 502, 504 and 506 in the generation of a list of tasks for the second interaction recording. An interaction recording that was generated after a first interaction between an agent and a customer may then be updated based on the list of tasks generated for the second interaction recording.

In operation 508, a computer system may optionally receive input from an agent related to a task of the list of tasks. For example, an agent using an agent computing device, e.g. computing device 210, may contact a client based on an allocated task that has been automatically generated and distributed to the agent, e.g. because the agent was mentioned in an interaction recording or a specific task was mentioned in an interaction recording that the agent is trained to handle. Tasks of a list of tasks may be presented or displayed to an agent, e.g. via a user interface of application 306. For example, an agent may engage with the list of tasks via application 306 and may review a generated list of tasks, may include annotations to a task or may update a status of task. For example, an agent may mark a task as "done", "no further action required", "NA" or "pending". Pre-selected responses that may be linked to an item of a list may be selected, e.g. from a pop-up schedule. In an example, an agent may set a reminder to follow up on a task, e.g. to prepare a response to a customer. Alternatively, an agent may comment on the status of a task using a free text note.

In case that the status of an actionable item is labelled as "NA" and a corrected actionable task is provided, e.g. by input from an agent, e.g. via agent device 202, a corrected task may be used in a re-training of an LSTM model.

For example, in the case that a task was corrected from "Jon reset the modem" to "Jon shut down and started the modem", the sentence of the task may be introduced to the LSTM model and may be assigned as including two nouns and two verbs (e.g. introduction of the sentence in table 1 with a label of 1 (positive)). Accordingly, an LSTM model may be continuously pre-trained.

An LSTM model may be re-trained when the number of tasks that have been answered "NA" reaches a specific threshold, e.g. a certain percentage of all answers given for a list of tasks. For example, in case that an answer "NA" has been received for more than 5% of the number of created tasks, the LSTM model may be re-trained with sentences that are derived from corrected actionable items. Re-training of an LSTM model based on received responses of agents to tasks of a list of tasks may allow updating an initially created LSTM model in the probabilistic identification of nouns, verbs and optionally temporal values. For example, depending on an environment in which a system is used, the vocabulary of agents and clients may encompass probabilities for the detection of constituents of a sentence that differ, e.g. within regions of a country or within a specific field of technology in which a system or method is used. Accordingly, re-training of an LSTM model based on received responses from agents may allow adjusting the identification of nouns, verbs and temporal values and may result in an LSTM model that can predict the presence of a noun, verb or a temporal value with an increased probability. For example, an LSTM model used in agent customer interaction in the United States may be re-trained based on an "American English" vocabulary that is predominantly used in the United States whereas an LSTM model used in customer agent interactions in the United Kingdom may be re-trained based on received feedback from agents that predominantly deal with clients using a "British English" vocabulary.

In operation 510, a computer system may distribute data representing interactions, e.g. a system may distribute tasks of a list of tasks based on input for a task provided by an agent. For example, an agent using an agent computing device, e.g. computing device 210, may indicate that they cannot handle a task, e.g. because they have not received training to carry out a specific task or they are not available to handle a task within an allocated time. A task of a list of tasks may be automatically distributed or re-distribute to another agent, e.g. an agent who is available or qualified to handle a task, e.g. by the system reviewing the agent's calendar or recorded qualifications of an agent.

Training of the LSTM Model:

An example for a network summary of an LSTM model as used in steps 502 and 504 is shown below, labelled Model: "sequential_1":

| Model: "sequential_1" | | |
|---|---|---|
| Layer (type) | Output Shape | Param # |
| embedding_1 (Embedding) | (None, 200, 8) | 8000 |
| global_max_pooling1d_1 (GlobalMaxPooling1D) | (None, 8) | 0 |
| dense_2 (Dense) | (None, 10) | 90 |
| dropout_1 (Dropout) | (None, 10) | 0 |
| dense_3 (Dense) | (None, 4) | 44 |

Total params: 8134 (31.77 KB)
Trainable params: 8134 (31.77 KB)
Non-trainable params: 0 (0.00 Byte)
None Model "sequential_1" may receive input in form of a sentence, e.g. embedding_1. Model "sequential_1" may provide output, e.g. labelled "dense_3", in form of probabilities for the identification of a first noun, e.g. a name, a second noun, e.g. a tangible or intangible object, a first verb, e.g. a verb in a future tense, and optionally a temporal value, e.g. a calendar date.

Figure 6:
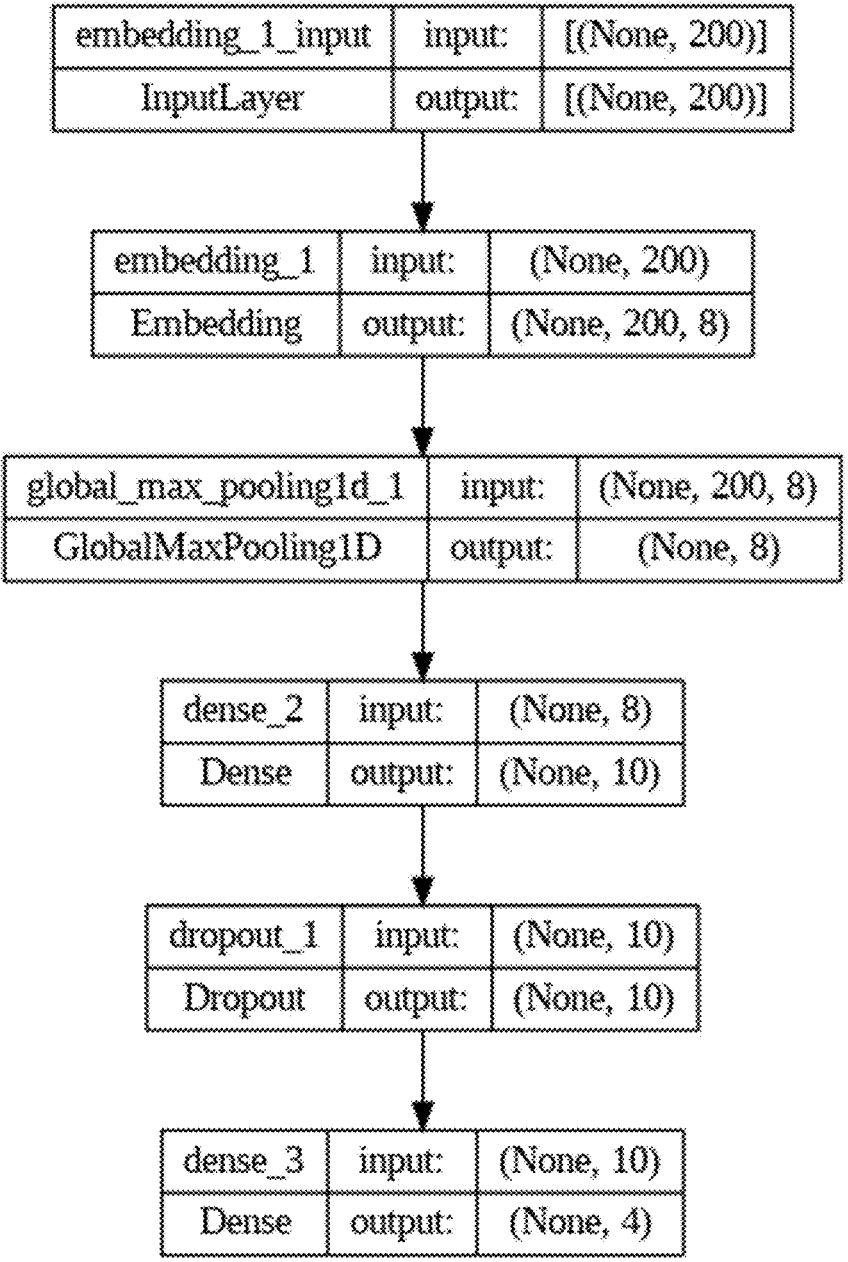
FIG. 6 illustrates a network architecture of an LSTM neural network, according to some embodiments of the present invention.

A network architecture of an example LSTM neural network 600 as used in steps 502 and 504 is shown in FIG. 6.

A first layer of a LSTM model may embed sentences of an interaction recording. Sentences of an interaction recording may be passed to or input into an LSTM with an activation function that is based on a hyperbolic tangent according to example Formula 1:

$$f(x) = \tanh(x) = \frac{2}{1 + e^{-2x}} - 1 \qquad \text{Formula 1}$$

Figure 7:
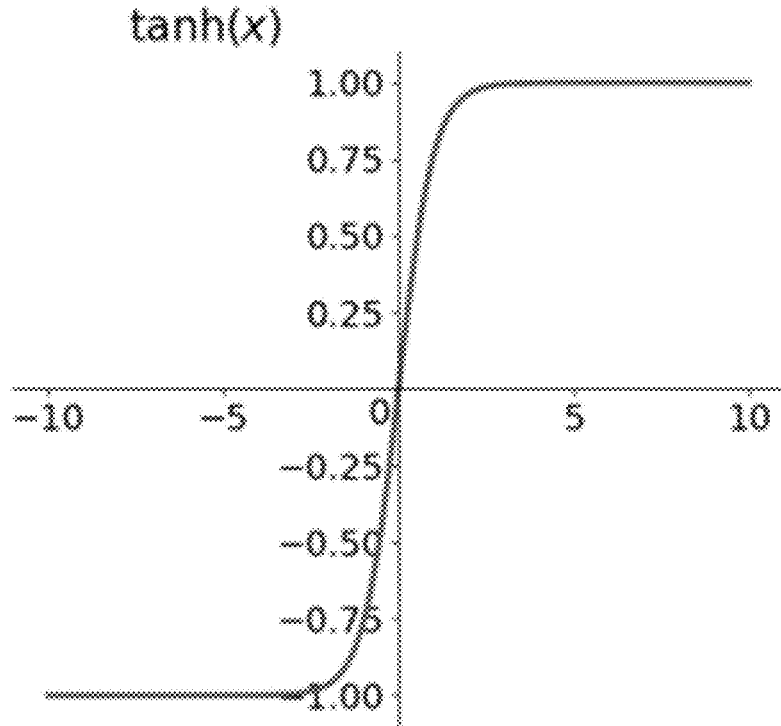
FIG. 7 illustrates an example activation function of an LSTM model, according to some embodiments of the present invention.

A graphical illustration of example formula 1 is shown in FIG. 7.

Figure 8:
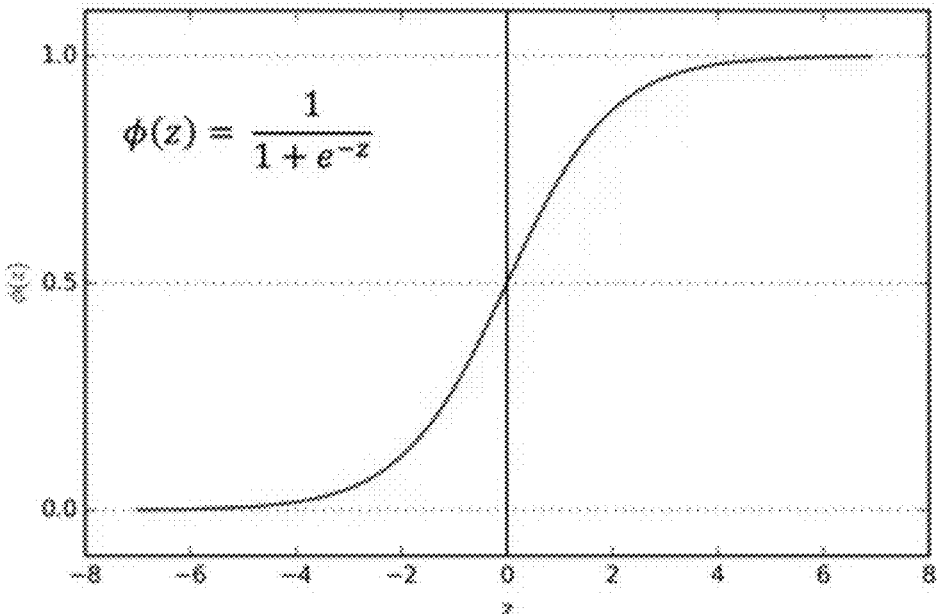
FIG. 8 depicts a sigmoid function that may be used in the generation of actionable items of an LSTM model, according to some embodiments of the present invention.

An output of an LSTM model may be represented by a sigmoid function, e.g. as represented by a sigmoid function shown in FIG. 8, and may include four categories to represent two nouns, a verb and a temporal value. Modification of the sigmoid function may allow setting thresholds for probability values in the identification of a first noun, a second, noun, a first verb and optionally a temporal value.

For generated actionable items that may include at least two nouns, at least one verb and a temporal value, four outputs may be generated and the categorical cross entropy between a plurality of outputs may be calculated according to example formula 2 for M=4. For example, a constituent of a sentence p, e.g. a word of a sentence, may be compared to a reference distribution of probabilities y for each of the four classes c (first noun, second noun, first verb, temporal value).

$$-\sum_{c=1}^{M} y_{i,c} \log(p_{i,c}) \qquad \text{Formula 2}$$

An LSTM model may be pre-trained using public data sets and may allow identifying specific categories within each sentence, e.g. nouns, verbs and temporal values. For example, a pre-trained LSTM model may be used to filter four relevant categories (first and second noun, verb, temporal value) from an arranged list of categories.

Table 1 provides three analysis examples for identified constituents of sentences:

In Example 1, a sentence may include a noun (name), a verb (future form), a time (temporal value) and a second noun. Accordingly, the sentence comprises at least two nouns and a verb and will be labelled with a "1" indicating a sentence that fulfilled the requirement for a sentence and an actionable item is generated for the sentence.

In Example 2, a sentence may include a noun (name), a verb (future form) and a second noun. Accordingly, the sentence comprises at least two nouns and a verb and may be labelled with a "1" indicating a sentence that fulfilled the requirement for a sentence and an actionable item is generated for the sentence.

In Example 3, a sentence may include a noun (name) and a time (temporal value) but lacks a verb and a second noun. Accordingly, the sentence does not include at least two nouns and a verb and may be labelled with a "0" indicating a sentence that does not fulfill the requirement for a sentence and the sentence may be deleted.

TABLE 1

Example of labelling of sentences
based on their identified constituents

| Example | Sentence | Label |
|---|---|---|
| 1 | noun(name) + verb (future form) + Time (temporal value) + noun | 1(positive) |
| 2 | noun(name) + verb (future form) + noun | 1(positive) |
| 3 | Time + noun. | 0(negative) |

Based on a pre-created table of analyzed sentences, such as table 1, a synthetic data set may be generated that can be used in the training of an LSTM model that can be used, e.g. in steps 504 and 506. A model summary used in the training of the LSTM model is shown below:

A model summary of a neural network may have a form shown below:

Model Summary:

Model: "sequential"

| Layer (type) | Output Shape | Param # |
|---|---|---|
| embedding (Embedding) | (None, 200, 8) | 8000 |
| conv1d (Conv1D) | (None, 196, 128) | 5248 |
| global_max_pooling1d (GlobalMaxPooling1D) | (None, 128) | 0 |
| dense (Dense) | (None, 10) | 1290 |
| dropout (Dropout) | (None, 10) | 0 |
| dense_1 (Dense) | (None, 1) | 11 |

Figure 9:
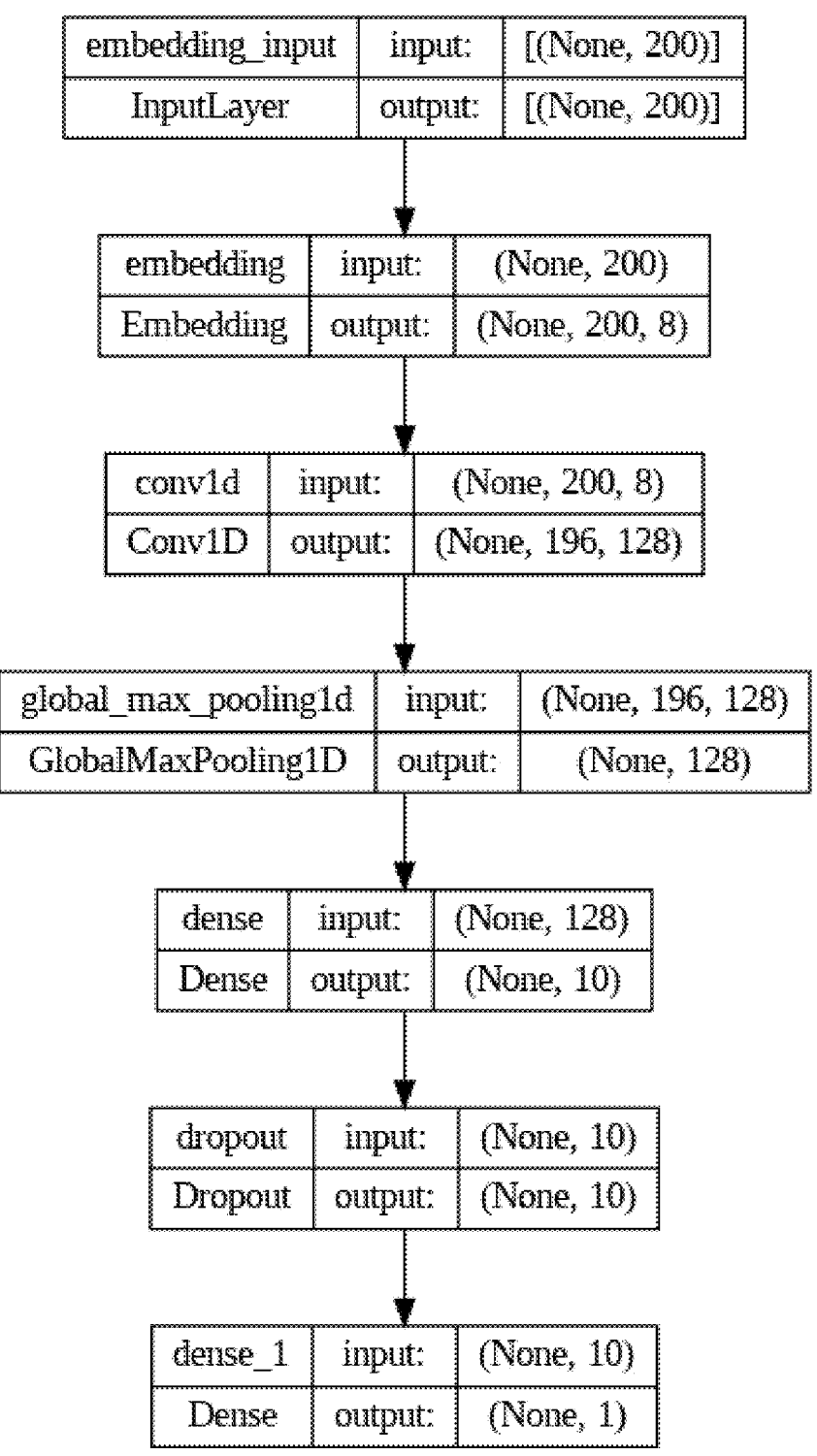
FIG. 9 illustrates a network architecture of an LSTM neural network, according to some embodiments of the present invention.

Total params: 14549 (56.83 KB)
Trainable params: 14549 (56.83 KB)
Non-trainable params: 0 (0.00 Byte)
None A corresponding architecture of a neural network 900 may be shown in FIG. 9.

For the identification of sentences using a convolution method, a convolution layer may be used to set a maximal character length for an input value, e.g. a maximal character length for a sentence. In case that a sentence includes fewer characters than an average sentence, an input value may be "padded" with added "0" values to adjust the number of characters to the average number of characters per sentence.

The convolutional 1d uses a reLU function, the reLU is calculated according to example formula 3.

In the context of artificial neural networks, a rectifier or reLU (rectified linear unit) activation function may be an activation function that can be expressed as the positive part of its argument as shown by example formula 3 and example formula 4:

$$f(x) = x^+ = \max(0, x) = \frac{x + |x|}{2} = \begin{cases} x & \text{if } x > 0, \\ 0 & \text{otherwise} \end{cases} \qquad \text{Formula 3}$$

$$f'(x) = \begin{cases} 1 & \text{if } x > 0, \\ 0 & \text{if } x < 0 \end{cases} \qquad \text{Formula 4}$$

For a normalization of an input sample, two layers of this function may be used. For a binary output, it may be possible to use a sigmoid function as shown in FIG. 8.

A machine learning model may use a binary classification to divide objects into classes, e.g. nouns, verbs or temporal values. A binary cross entropy may be a loss function to measure a difference between a predicted binary outcome and an actual binary label. Binary cross entropy may compare predicted probabilities for an actual class output that can either be 0 or 1.

Incorrect labelling of a data class by a model, e.g. wrongly identifying a constituent as a noun, may be expressed by binary cross-entropy also known as logarithmic loss or log loss. A binary cross-entropy model may reflect deviations in probability that occur in the classification of labels. A low log loss value may equate to high accuracy values in the determination of classes, e.g. nouns, verbs and temporal values.

A loss function may be described in example formula 5. In case of a multi-class classification problem, a Log loss may be calculated using example formula 5. Parameter N may reflect the number of rows and parameter M may reflect the number of classes and y may reflect a label and I the number of labels.

$$H_p(q) = -\frac{1}{N}\sum_{i=1}^{N} y_i \cdot \log(p(y_i)) + (1 - y_i) \cdot \log(1 - p(y_i)) \qquad \text{Formula 5}$$

For example, for a list of sentences, as shown in table 1, a loss in multiclass entropy $H_p(q)$ in the comparison between predicted probabilities for an actual class output that can either be 0 or 1.

A table of generated sentences, e.g. as shown in table 1, may be used to compare predicted probabilities and actual class output. In the present case, about 70% of recorded data have been used for training of the model, 20% have been used for testing and 10% have been used for validation. Label y can be predicted, for example, with a cutoff of 50% of the probability for "1/0".

Example: Automatic Generation of Schedules of Actionable Items and Allocation of Tasks Between Agents An interaction recording between a customer and an agent may read:

Agent: Hi, Could you verify your address for me.

Customer: Alrighty, yeah it's 207 Smarts lane.

Agent: Thank you. I can see a reservation for Mr Bond in Spain for November 3 to November 8. Do you want to confirm those dates?

Customer: I'm actually calling to change the dates.

Agent: Okay, so this is the confirmation department. I'll connect you with a vacation advisor. Currently, they are out of office but I will call them. Meanwhile, I can cancel the original reservation and send you a confirmation mail, once I have received approval. Also, if you would like I can call you back once the vacation advisor team is available.

Customer: Okay, thank you.

Based on the analysis of the interaction recording between a customer and an agent, application 306 may generate a list of tasks for the interaction recording. A list of tasks may be automatically generated for an agent once an interaction between an customer and an agent has ended. For example, a list of tasks may be provided to an agent in form of a pop-up window as shown in FIG. 10. A list of tasks may be linked to pre-defined actions, e.g. "done", "pending", "NA". Alternatively, a list of tasks may be linked to actions that require input of an agent.

A list of tasks may include an automatically generated suggestions. For example, a pop-up window as shown in FIG. 11 may include pre-indicated answers to the generated list of tasks as shown in FIG. 11. For example, if application 306 identifies that a specific task has already been completed, a schedule of actionable items may include preselected an answer to a specific task, e.g. the answer "done" to an actionable item that may have been completed or is likely to be completed with a certain probability based on an interaction protocol.

Actionable items that require a future action of an agent may automatically be assigned to a work schedule of an agent. In some cases, if an agent is not available to deal with a future action, a future action may be automatically assigned to another agent that is available on a specific date. Example: Automatic Creation of Tasks for Agents An LSTM model may further be trained to automatically assign pending tasks of a list of tasks to an agent whose name has been identified in a task, or may be added to a work schedule of an agent in case that a temporal value is present in a task. with responses or input from an agent to a schedule of actionable items.

Figure 12:
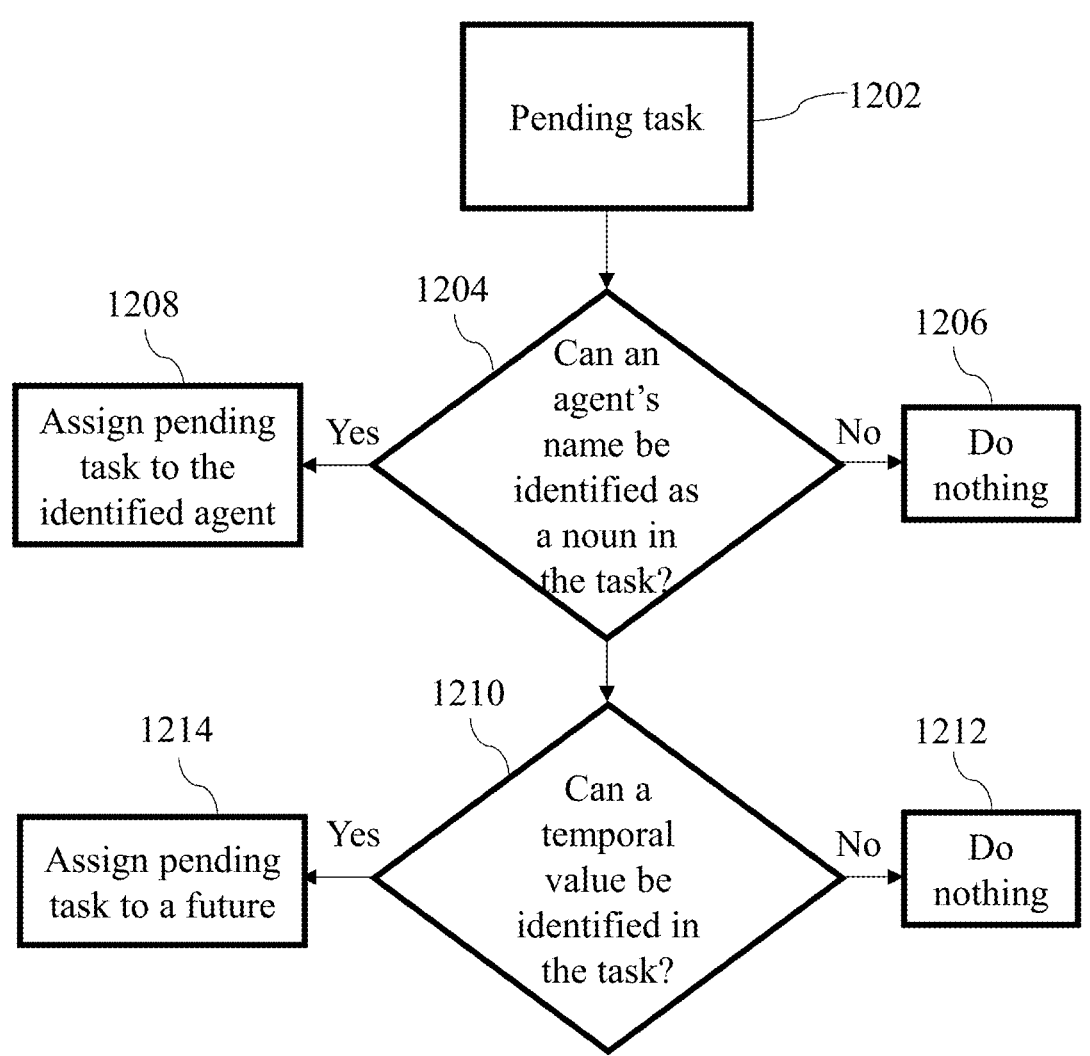
FIG. 12 depicts an allocation diagram for pending tasks of a list of tasks for an agent, according to some embodiments of the present invention.

FIG. 12 shows an allocation diagram 1200 for pending tasks of a list of tasks for an agent. A pending task 1202 may be analyzed for the presence of a noun that can be identified as an agent's name (1204). If no name of an agent can be identified, the pending task is not assigned to a specific agent (1206). When a name of an agent can be identified in a task, the pending task may be assigned to the identified agent (1208). For example, if a pending task includes an ID or name of an agent, it is automatically assigned to the work schedule of an agent that matches the ID or agent name. It is then assessed if a temporal value can be identified in a task (1210). When a task includes a date or time, a task may be automatically assigned to a future work schedule, e.g. a work schedule of a specific agent if the task also includes a name of an agent (1214). In case that no temporal value can be identified in a task, the task is not assigned to a future work schedule (1212).

Accordingly, application 306 may be configured to automatically allocate a task to an agent's work shift. The creation of task may require details on the task (e.g., What to do), on the relevant time period in which a task should be completed (e.g., when), and whether an answer related to the task must be provided to a specific customer or agent (e.g., to whom).

Application 306 may automatically update an Interactive Voice Response (IVR) for future actionable items. For example, application 306 may review the workload of pending task for an agent over period of time. In case that the workload for an agent is higher than the average task per agent in the Line of Business (LOB) their related future IVR Request will be send to the agent with the lowest workload. For an example, if agent A has been assigned with four tasks to be completed within 2 hours and agent B has been assigned with two tasks to be completed within 2 hours, a subsequent task may be automatically assigned to Agent B instead of A.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved, It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

What is claimed is:

1. A method of generating a list of tasks from an interaction recording, the method comprising:
   identifying, for each sentence of one or more sentences of an interaction recording, whether the sentence comprises at least two nouns and at least one verb;
   generating a set of actionable items using a long short-term memory (LSTM) model by:
      when the sentence does not comprise at least two nouns and at least one verb, deleting the sentence; and
      when the sentence comprises at least two nouns and at least one verb, generating an actionable item;
   inputting the actionable items to a language model to generate a list of tasks, each task of the generated list of tasks comprising at least one of: an instruction to carry out a job, and a temporal value, the temporal value comprising a time limit by which the task needs to be completed; and
   automatically distributing one or more tasks of the generated list of tasks to one or more computer devices.

2. A method according to claim 1, wherein the at least two nouns are identified probabilistically by comparing one or more constituents of the sentence with a plurality of recorded nouns of the LSTM model.

3. A method according to claim 1, wherein the at least one verb is identified probabilistically by comparing one or more constituents of the sentence with a plurality of recorded verbs of the LSTM model.

4. A method according to claim 1, wherein the method comprises filtering one or more sentences of the interaction recording which are outgoing interactions of an agent device.

5. A method according to claim 1, wherein identifying comprises the identification of at least two nouns, at least one verb and at least one temporal value, and the method comprises:
   when the sentence does not comprise the at least two nouns, at least one verb and at least one temporal value, deleting the sentence; and
   when the sentence comprises the at least two nouns, at least one verb and at least one temporal value, generating an actionable item.

6. A method according to claim 5, comprising ordering the actionable items by the at least one temporal value.

7. A method according to claim 1, comprising generating an indication whether a task of the list of tasks is completed.

8. A method according to claim 1, wherein the list of tasks comprises a pre-indication to a status of each task identified by the LSTM model.

9. A method according to claim 1, comprising updating a previously generated list of tasks by the list of tasks generated from the interaction recording.

10. A method according to claim 1, wherein the list of tasks is used in the automatic distribution of workload between agents of a contact center.

11. A system for generating a list of tasks from an interaction recording, the system comprising:
   a computing device;
   a memory; and
   a processor, the processor configured to:
      identify, for each sentence of one or more sentences of an interaction recording, whether the sentence comprises at least two nouns and at least one verb;
      generate a set of actionable items using a long short-term memory (LSTM) model by:
         when the sentence does not comprise at least two nouns and at least one verb, deleting the sentence; and
         when the sentence comprises at least two nouns and at least one verb, generating an actionable item;
      input the actionable items to a language model to generate a list of tasks, each task of the generated list of tasks comprising at least one of: an instruction to carry out a job, and a temporal value, the temporal value comprising a time limit by which the task needs to be completed; and
      automatically distributing one or more tasks of the generated list of tasks to one or more computer devices.

12. A system according to claim 11, wherein the at least two nouns are identified probabilistically by comparing one or more constituents of the sentence with a plurality of recorded nouns of the LSTM model.

13. A system according to claim 11, wherein the at least one verb is identified probabilistically by comparing one or more constituents of the sentence with a plurality of recorded verbs of the LSTM model.

14. A system according to claim 11, wherein the processor is configured to filter one or more sentences of an interaction recording which are outgoing interactions of an agent.

15. A system according to claim 11, wherein the processor is configured to identify, for each sentence of the one or more sentences, whether the sentences comprises at least two nouns, at least one verb and at least one temporal value:

when the sentence does not comprise the at least two nouns, at least one verb and at least one temporal value, delete the sentence; and when the sentence comprises the at least two nouns, at least one verb and at least one temporal value, generate an actionable item.

16. A system according to claim 11, wherein the processor is configured to generate an indication whether a task of the list of tasks is completed.

17. A system according to claim 11, wherein the list of tasks comprises a pre-indication to a status of each task identified by the LSTM model.

18. A system according to claim 11, wherein the processor is configured to update a previously generated list of tasks by the list of tasks generated from the interaction recording.

19. A system according to claim 11, wherein the list of tasks is used in the automatic distribution of workload between agents of a contact center.

20. A method for generating a schedule of actions from an interaction transcript, wherein the method comprises:

dividing at least one sentence of an interaction transcript into one or more parts;

generating a set of actionable items using a long short-term memory (LSTM) model by:

identifying, for each sentence of the at least one sentence, whether the one or more parts of the sentence comprise at least two nouns and at least one verb, and:

when the parts of the sentence do not comprise the at least two nouns and the at least one verb, deleting the sentence; and when the parts of the sentence comprises the at least two nouns and the at least one verb, generating an actionable item;

subjecting the actionable items to a language model to generate a schedule of actions, each action of the generated schedule of actions comprising at least one of: an instruction to carry out a job, and a temporal value, the temporal value comprising a time limit by which the action needs to be completed; and automatically distributing one or more actions of the generated schedule of actions to one or more computer devices.

* * * * *